United States Patent [19]

Minami

[11] Patent Number: 4,883,104

[45] Date of Patent: Nov. 28, 1989

[54] STUDDED TIRE APPARATUS

[76] Inventor: Tomiji Minami, 59, Suwa 2-chome, Toyokawa 422, Japan

[21] Appl. No.: 206,703

[22] Filed: Jun. 16, 1988

[51] Int. Cl.$^4$ ............................................. B60C 11/00
[52] U.S. Cl. ..................................... 152/210; 152/216
[58] Field of Search .................... 152/167, 208, 209 R, 152/210, 213 R, 213 A, 216, 220; 301/39 R, 41 R, 43, 45; 180/15, 16, 9.26

[56] References Cited

U.S. PATENT DOCUMENTS 4,180,115 12/1979 Yamagishi ........................... 152/216

Primary Examiner—Michael W. Ball
Assistant Examiner—Gregory J. Wilber
Attorney, Agent, or Firm—Marshall, O'Toole, Gerstein, Murray & Bicknell

[57] ABSTRACT

A studded tire apparatus for a wheel rotatably mounted on a vehicle, a tire being mounted on the wheel. The tire has a plurality of angularly spaced pairs of passages formed therein leading to the outer peripheral surface thereof, and a belt extends movably through each of the pairs of passages. A stud is fastened to each of the belts and is movable with the associated belt between projected and retracted positions. A gear train is mounted on the wheel and connected with the belts for moving the belts and the studs between the above positions, and an electric motor is connected to the gear train for operating the gear train.

5 Claims, 5 Drawing Sheets

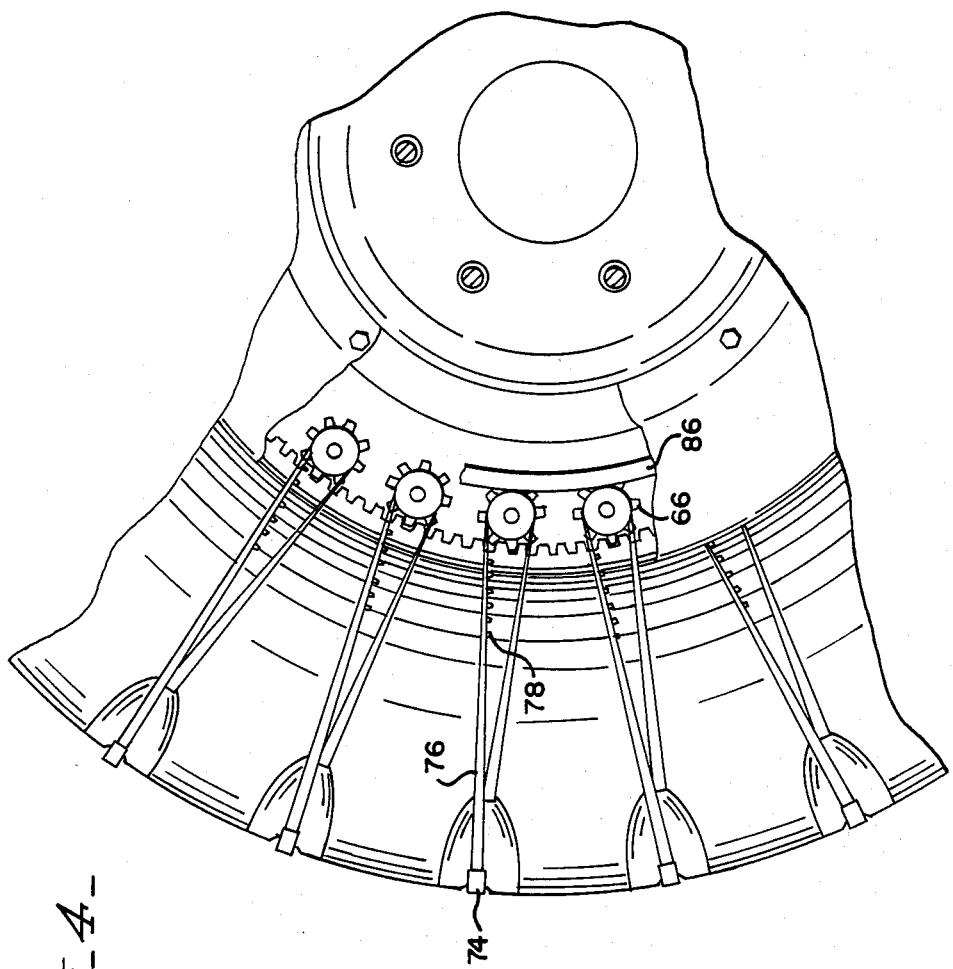

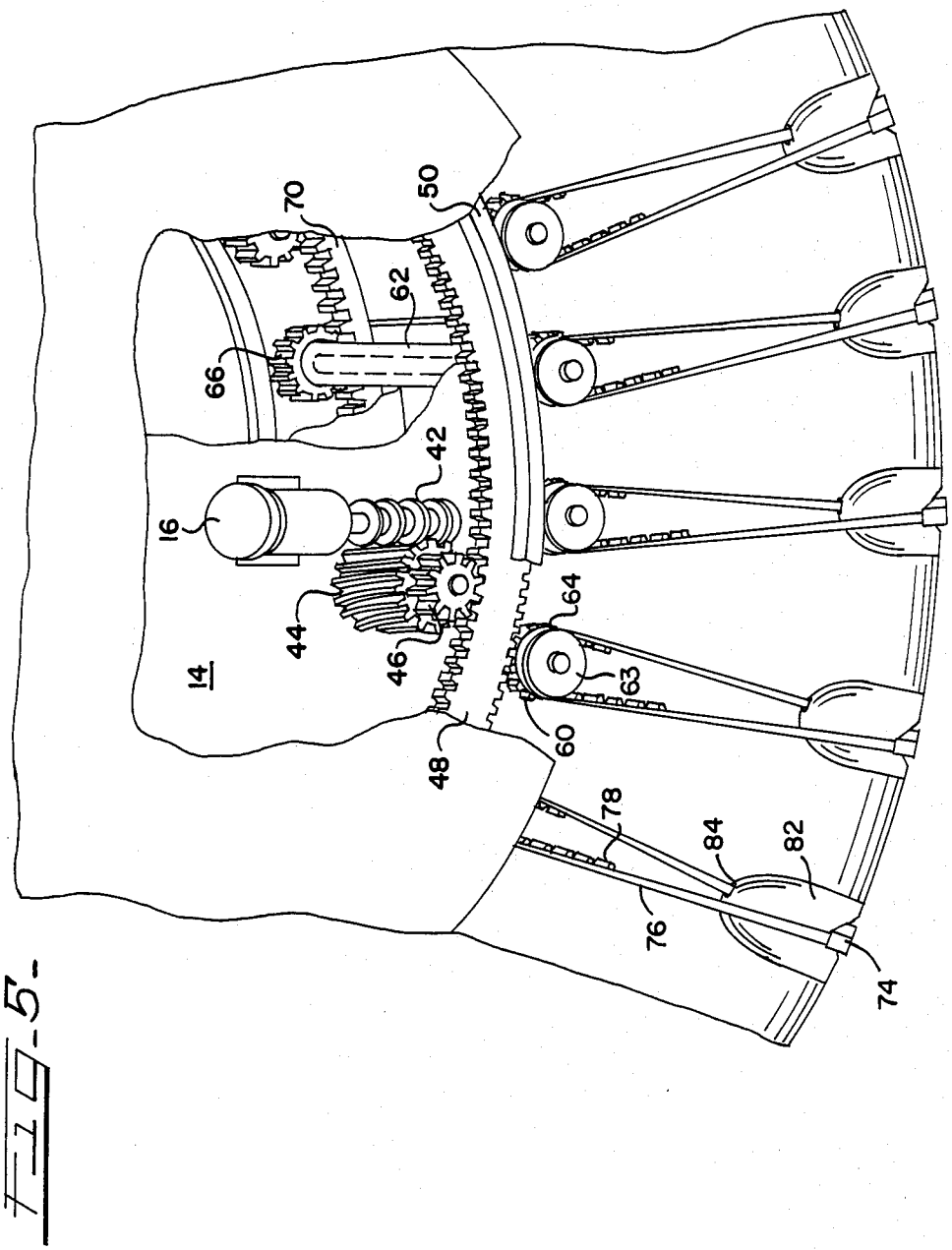

STUDDED TIRE APPARATUS

FIELD AND BACKGROUND OF THE INVENTION

The present invention relates to a studded tire for a wheeled vehicle such as an automobile or a motorcycle.

Different devices have been used on vehicle tires in order to increase the traction between the tires and the road, particularly during ice and/or snow conditions. The most commonly used device has been chains which are removably mounted on the tires. However, tire chains are troublesome to attach and remove. Tires have also been provided with permanent studs or spikes, but a studded tire of this type would also travel on roads which do not have a snow or ice cover. This damages the road surfaces and produces a dust of asphalt. For this reason, such tires are prohibited in some states.

It is a general object of this invention to provide an apparatus for projecting or retracting studs on a tire by operation from the driver's seat of a car or other motor vehicle.

SUMMARY OF THE INVENTION

A studding apparatus for a tire on a wheel which supports a vehicle body, in accordance with this invention, includes an electric motor mounted on the wheel, first and second limit switches mounted on the wheel and electrically connected to the motor, and a change-over switch having first and second contacts electrically connected to the first and second limit switches, respectively. The change-over switch connects to a power source mounted on the vehicle body. Gear means is supported rotatably and coaxially on the wheel, the gear means being connected to be rotated by the motor. Rotating means is journalled on the wheel adjacent the tire and the rotating means has a pinion which is in driving mesh with the gear means. The tire has a hole formed through it on at least one side, and the hole opens at the outer peripheral surface of the tire. Further, a belt is in driving engagement with the rotating means, and the belt extends substantially radially of the tire and loosely through the hole. A stud is carried by the belt and is moved between projected and retracted positions. Part of the gear means is adapted to operate the limit switches when the gear means rotates. The first limit switch is closed when the stud is in the retracted position so that, if the change-over switch is thrown to the first contact, the motor rotates in one direction to move the belt and thereby the stud toward the projected position. The first limit switch is open when the stud is in the projected position. The second limit switch is closed when the stud is in the projected position so that, if the change-over switch is thrown to the second contact, the motor rotates in the other direction to move the spike toward the retracted position. The second limit switch is open when the stud is in the retracted position.

BRIEF DESCRIPTION OF THE DRAWINGS

The invention will be better understood from the following detailed description taken in conjunction with the accompanying figures of the drawings, wherein:

FIG. 4 is a fragmentary view taken on the line 4—4 of FIG. 1; and

FIG. 5 is an enlarged fragmentary perspective view taken from the left side of FIG. 1.

DETAILED DESCRIPTION OF THE DRAWINGS

Figure 1:
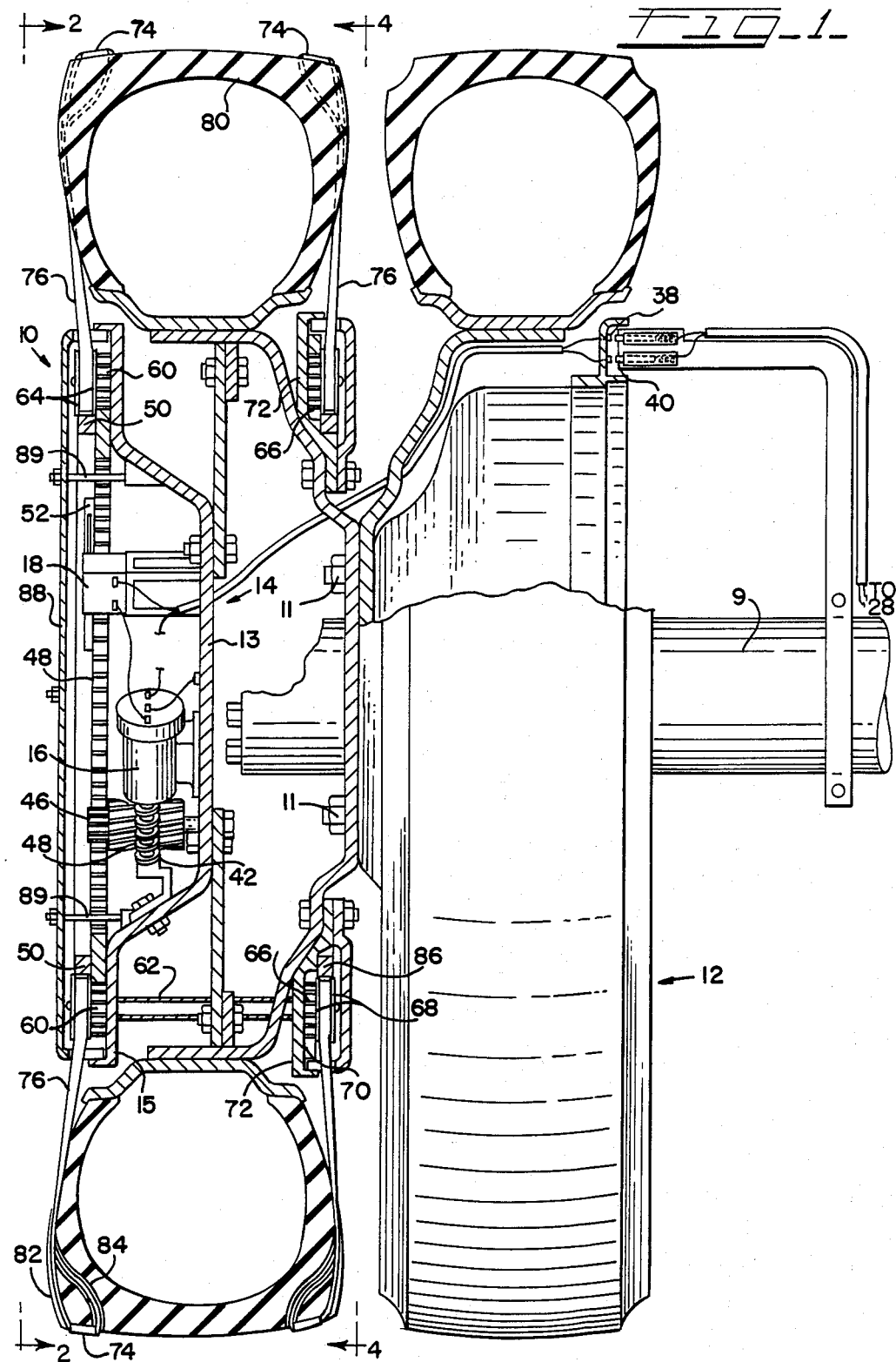
FIG. 1 is a side view, partially in radial cross section, of the rear wheels on one side of a truck, including apparatus in accordance with the invention.

With reference to FIG. 1, the apparatus according to this invention is applied to the outer wheel 10 of a pair of rear wheels 10 and 12 on each side of a vehicle. The outer wheel 10 is mounted on the axially inner wheel 12 of the pair by bolts 11, and the two wheels are mounted on a vehicle axle 9.

Figure 2:
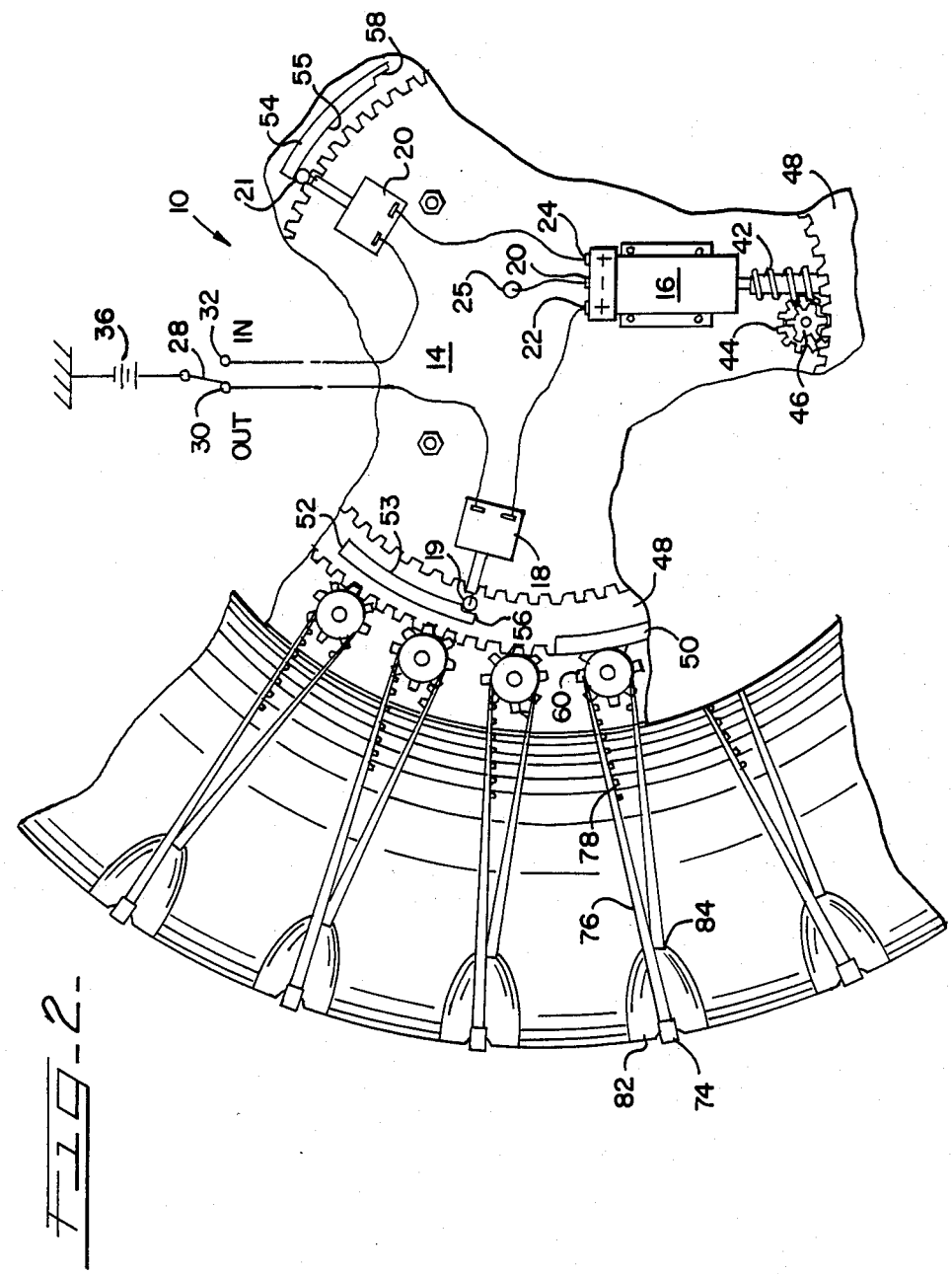
FIG. 2 is a fragmentary side view taken on the line 2—2 of FIG. 1 and shows the studs in the projected position.
Figure 3:
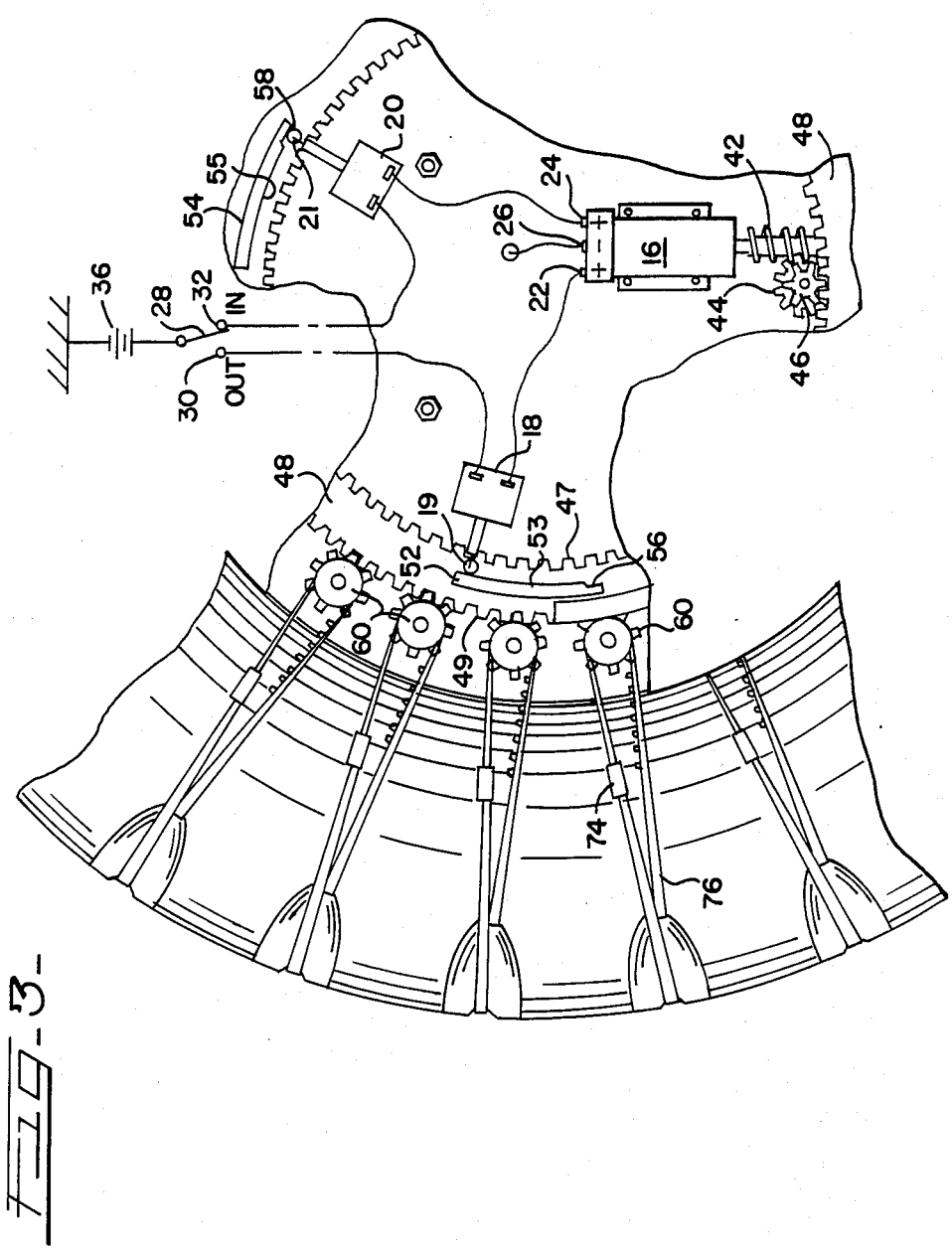
FIG. 3 is a view similar to FIG. 2, but shows the studs in the retracted position.

As shown in FIGS. 1-3, coaxially bolted to the outer wheel 10 is a bowl-shaped disc 14 having a center bottom 13, which opens axially outwardly, and a peripheral flange 15. Mounted on the center bottom 13 are a DC electric motor 16 and a pair of limit switches 18 and 20 which include cam followers 19 and 21 (see FIG. 2), respectively.

As shown in FIGS. 2 and 3, the motor 16 has a pair of spaced "+" terminals 22 and 24 and a "−" terminal 26 between the terminals 22 and 24, and the terminal 26 is grounded via the truck body at the connection 25. The + terminal 22 is connected through the limit switch 18 to the contact 30 labeled "OUT" of a manual switch 28 which is preferably mounted adjacent the driver's seat of the vehicle. The + terminal 24 is connected through the other limit switch 20 to the contact 32 labeled "IN" of the switch 28. The movable contact of the manual switch 28 is connected to the positive pole of a battery 36 such as the main battery of the vehicle. The negative pole of the battery 36 is grounded via the truck body.

As shown in FIG. 1, the electrical connections between the manual switch 28 on the truck body and the limit switches 18 and 20 on the wheel 10 is achieved by the engagement between a pair of conductive rings 38 on the inner wheel 12 and a pair of carbon brushes 40 on the body of the vehicle.

As best shown in FIG. 5, the output shaft of the motor 16 has fastened to it a worm 42 which meshes with a helical or worm gear 44 that is rotatably mounted on the disc 14 and extends axially of the wheel. The worm gear 44 terminates at one end thereof in a pinion 46.

A ring gear 48 is supported coaxially for rotation on the disc 14, and it has both inner and outer teeth 47 and 49. The inner teeth 47 mesh with the pinion 46. The ring gear 48 has a guide ring 50 (see FIGS. 1 and 5) fixed to its axially outer wall adjacent its outer periphery.

As shown in FIGS. 2 and 3, the ring gear 48 also carries a pair of arcuate cams 52 and 54 which have inner peripheral surfaces 53 and 55, respectively. These surfaces 53 and 55 terminate in recesses 56 and 58, respectively, at one end thereof, at their clockwise rearward and forward ends.

The cam surfaces 53 and 55 are engageable by the followers 19 and 21, respectively, to close the limit switches 18 and 20 upon rotation of the ring gear. The recesses 56 and 58 can also be engaged by the followers to open the limit switches.

The outer teeth 49 of the ring gear 48 mesh with a number of angularly spaced pinions 60 which are journalled for rotation on the flange 15 of the disc 14. At least one of the pinions 60 is fixed to the outer end of a shaft 62 (FIG. 1), which is journalled for rotation on the wheel and extends axially of the wheel.

Fixed coaxially to the axially outer side of each pinion 60 are a pair of flanges 64 of a toothed pulley 63, which flanges sandwich outer peripheral teeth (not shown). The innermost of the two flanges 64 and the flange 15 of the disc 14 hold the ring gear 48 against axial movement but allow it to rotate.

As shown in FIGS. 1, 4 and 5, fixed to the axially inner end of the shaft 62 are a pinion 66, flanges 68 of a toothed pulley and outer teeth between the flanges, similar to the pinion 60 and pulley 63 on the axially outer end of the shaft 62. On this inner side, further sets of axially spaced pinions 66, pulley flanges 68 and outer teeth between the flanges are journalled on the wheel. The pinions 66 mesh with inner teeth of another ring gear 70 on the interior side of the wheel 10, which is rotatably held by the adjacent flanges 68 and an annulus 72 which is fixed to the wheel.

The outer teeth (not shown) of the pulleys associated with the pinions 60 and 66 mesh with teeth formed o the inner surfaces of a plurality of belts 76 which have interior teeth at least in their portions which are adjacent the toothed pulleys, and each of the belts carries a stud 74 fixed to its outer surface.

A tire 80 is mounted on the wheel 10 and it is formed with pairs of generally radially extending guide grooves 82 in its side walls and holes 84 adjacent its outer periphery on both sides thereof. The groove 82 and the hole 84 of each pair are spaced in the axial direction of the tire and they extend to the radially outer surface or tread of the tire. A belt 76 is looped through each of the pairs, and the belts 76 can move in the grooves and holes. The belts 76 are also looped between the flanges 64 and 68 of the adjacent pulley 63, there being one pulley 63 for each belt, and are guided by the guide ring 50 and another guide ring 86 which is fixed to the wheel.

A wheel cover 88 is preferably bolted to the wheel on the axially outer side by fasteners 89 and encloses the gears, belts, etc.

In operation, when in the retracted position where the spikes 74 are as shown in FIG. 3, the limit switch 18 is closed and the limit switch 20 is open. If the manual switch 28 is thrown to engage the contact 30, an electric current flows through the limit switch 18 to the + terminal 22 of the motor 16. This causes the motor 16 to rotate in one direction and rotate the ring gear 48 clockwise, which causes the belts to move. This action moves the studs 74 on the belts 76 outwardly to the projected position where they project from the outer surface of the tread.

When the cam follower 19 of the limit switch 28 drops in the recess 56 as shown in FIG. 2, the limit switch 18 opens to stop the motor 16, thus holding the spikes 74 at the projected position. At this stage, the other limit switch 20 is closed because its cam follower 21 engages the cam surface 55. If the manual switch 28 is thrown to engage the contact 32, electric current flows through the limit switch 20 to the + terminal 24 of the motor 16. This rotates the motor 16 in the reverse direction to rotate the ring gear and the belts to retract the spikes 74. With reference to FIG. 3, when the cam follower 21 drops into the recess 58, the spikes 74 stop at the retracted position.

In the retracted and the projected positions, when the motor 16 is not energized, the worms 42 of the motor and the worm gear 44 are kept from rotating by their mutually perpendicular engagement, and thereby hold the spikes 74 in such positions. This is true because, while a rotative force on a worm 42 can easily rotate a worm gear 44, a rotative force on a worm gear 44 will not easily rotate the worm 42. The studs are supported against the traction forces during rotation of the tire because the sides of each stud engage the sides of the groove in which it moves and is supported thereby, as shown in FIG. 1.

What is claimed is:

1. A stud apparatus for a rotatable wheel surrounded by a tire and supporting a vehicle body, said apparatus comprising an electric motor mounted on said wheel, first and second limit switches mounted on said wheel and electrically connected to said motor, a change-over switch having first and second contacts electrically connected to said first and second limit switches, respectively, said change-over switch further being connected to a power source mounted on said vehicle body, gear means supported rotatably and coaxially on said wheel, said gear means being connected to be rotated by said motor, rotating means journalled on said wheel adjacent said tire, said rotating means having a pinion in driving mesh with said gear means, a belt in driving engagement with said rotating means, said tire having a hole formed through it on at least one side thereof, said hole opening at the outer peripheral surface of said tire, said belt extending substantially radially of said tire and loosely through said hole, a stud carried by said belt and movable between projected and retracted positions, part of said gear means being adapted to operate said limit switches when said gear means rotates, said first limit switch being closed when said stud is in said retracted position so that, if said change-over switch is thrown to said first contact, said motor rotates in one direction to move said stud toward said projected position, said first limit switch being open when said stud is in said projected position, said second limit switch being closed when said stud is in said projected position so that, if said change-over switch is thrown to said second contact, said motor rotates in the other direction to move said stud toward said retracted position, said second limit switch being open when said stud is in said retracted position.

2. A studded tire apparatus comprising a wheel adapted to be rotatably mounted on a vehicle, a tire mounted on said wheel, said tire having a plurality of angularly spaced pairs of passages forming holes on opposite sides of said tire leading to the outer peripheral surface thereof, a belt extending movably through each of said pairs of passages, a stud fastened to each of said belts and movable with the associated belt between projected and retracted positions, gear means mounted on said wheel and connected with said belts for moving said belts and said studs between said positions, and an electric motor connected to said gear means for operating said gear means.

3. Apparatus as set forth in claim 2, wherein said gear means comprises a worm connected to said motor, a worm gear connected to said worm, a ring gear extending adjacent said belts and connected to said worm gear, and a plurality of gears connected to said ring gear and to said belts.

4. Apparatus as set forth in claim 3, and further including limit switch means coupled to said ring gear and electrically connected to control operation of said motor.

5. Apparatus as set forth in claim 3, wherein the vehicle includes a driver's compartment, and further including a manually operable switch adapted to be mounted in said compartment and electrically connected to said limit switches and to said motor.

* * * * *